United States Patent
Venkata Naga Ravi

(10) Patent No.: US 8,386,533 B2
(45) Date of Patent: Feb. 26, 2013

(54) RECORDS MANAGEMENT OF DATABASE TABLES

(75) Inventor: Kiran Vedula Venkata Naga Ravi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 12/956,395

(22) Filed: Nov. 30, 2010

(65) Prior Publication Data

US 2012/0136904 A1 May 31, 2012

(51) Int. Cl.
*G06F 7/00* (2006.01)
*G06F 17/30* (2006.01)

(52) U.S. Cl. ......................... 707/803; 707/802

(58) Field of Classification Search .................. None
See application file for complete search history.

(56) References Cited

U.S. PATENT DOCUMENTS

| | | | |
|---|---|---|---|
| 6,505,188 B1* | 1/2003 | Ghazal et al. ................. | 707/714 |
| 6,625,546 B2* | 9/2003 | Sepetov et al. ................. | 506/8 |
| 7,703,125 B2 | 4/2010 | Motoyama | |
| 7,870,174 B2* | 1/2011 | Eadon et al. ................. | 707/953 |
| 8,145,606 B2* | 3/2012 | Herbst et al. ................. | 707/662 |
| 2005/0223414 A1* | 10/2005 | Kenrich et al. ................. | 726/27 |
| 2006/0149735 A1* | 7/2006 | DeBie et al. ................. | 707/8 |
| 2007/0150521 A1 | 6/2007 | Vedula | |
| 2007/0161039 A1* | 7/2007 | Wagner et al. ................. | 435/7.1 |
| 2007/0294308 A1* | 12/2007 | Megerian ................. | 707/200 |
| 2008/0263297 A1* | 10/2008 | Herbst et al. ................. | 711/161 |
| 2009/0100089 A1* | 4/2009 | Eadon et al. ................. | 707/102 |
| 2009/0119354 A1 | 5/2009 | Stuart et al. | |
| 2009/0150336 A1* | 6/2009 | Basu et al. ................. | 707/2 |
| 2009/0158425 A1 | 6/2009 | Chan et al. | |
| 2009/0254585 A1 | 10/2009 | Akers et al. | |
| 2009/0307743 A1* | 12/2009 | Azagury et al. ................. | 726/1 |
| 2010/0095349 A1 | 4/2010 | Motoyama | |
| 2011/0106770 A1* | 5/2011 | McDonald et al. ........... | 707/661 |

OTHER PUBLICATIONS

Ataullah et al., Records Retention in Relational Database Systems, Oct. 2008, ACM, pp. 873-882.*
Oracle Records Management Administrator's Guide 10g (10.1.1), Oracle Records Management, http://download.oracle.com/docs/cd/B15595_01/content.101/b16225/6 . . . , Jul. 2005, pp. 1-7, Oracle Corporation, Redwood Shores, CA.

* cited by examiner

*Primary Examiner* — Wilson Lee
*Assistant Examiner* — Jessica N Le
(74) *Attorney, Agent, or Firm* — Kraguljac Law Group, LLC

(57) ABSTRACT

Systems, methods, and other embodiments associated with records management are described. One example method includes managing a relational database for compliance with record retention rules, where the relational database includes a table organized with rows and columns. The relational database provides options for designating rows for records management.

18 Claims, 5 Drawing Sheets

AC_PAYABLES Table 200 (before)

| Payment ID | Payer ID | Amount | Description | Ref. No. |
|---|---|---|---|---|
| 1 | 145 | $100000 | Pay acme | CH-51565 |
| 2 | 145 | $1000 | Pay micky | CH-2566 |
| 3 | 52526 | $500000 | Pay hardware | ELCH-2626 |
| 4 | 265 | $1000 | Party entertainment | EXP-25266 |
| ... | | | | |

Figure 2a

AC_PAYABLES Table 200 (after)

| Payment ID | Payer ID | Amount | Description | Ref. No. | REC_ID |
|---|---|---|---|---|---|
| 1 | 145 | $100000 | Pay acme | CH-51565 | 1515515 |
| 2 | 145 | $1000 | Pay micky | CH-2566 | |
| 3 | 52526 | $500000 | Pay hardware | ELCH-2626 | 2552525 |
| 4 | 265 | $1000 | Party entertainment | EXP-25266 | 25252525 |
| ... | | | | | |

Figure 2b

AC_PAYABLES Life Cycle Table 220

| Action Date/ Duration | Action | REC_ID | SEQ |
|---|---|---|---|
| 3 years | RETAIN | 1515515 | 1 |
| 0 years | DELETE | 1515515 | 2 |
| 3 years | DELETE | 2552525 | 1 |
| 1 year | ARCHIVE | 25252525 | 1 |

Figure 2c

AC_PAYABLES Life Cycle Log Table 230

| Action Date | Action | REC_ID | Details |
|---|---|---|---|
| 03/05/2010 | RETAIN | 1515515 | Success |
| 02/04/2010 | DELETE | 1515515 | Success |
| 02/10/2008 | DELETE | 2552525 | Illegal Access |
| 02/09/2009 | ARCHIVE | 25252525 | Retrying |

Figure 2d

RECORDS MANAGEMENT OF DATABASE TABLES

BACKGROUND

Many business organizations have found that the importance and volume of business-critical records is rapidly increasing. Because of this, many companies are reevaluating their unstructured data strategy and are turning towards more reliable records management policies.

"Records management" is the systematic and comprehensive control of the creation, capture, maintenance, filing, use, and disposition of records. It aims to ensure that records contained in a database are authentic and reliable; can be retrieved when needed as quickly and efficiently as possible; and are not destroyed prematurely or kept longer than required. A "record" in the compliance industry is any data item (recorded information) that is under records management control and subject to a life cycle. A record's life cycle is the life span of a record from its creation or receipt to its final disposition. It is usually described in three stages: creation, maintenance and use, and final disposition. A set of retention rules/policies are applied to the record over a defined time period.

Different user applications (e.g. email, accounting, personnel, etc.) operate with different types of data that use different databases. To control access to its associated database, each user application must implement policies/rules that apply to its data. For example, an email application can implement a retention policy that emails will be maintained in the database for 7 years. However, someone with direct access to the database (e.g. a database administrator) can by-pass the email application policy and delete emails directly from the database (intentionally or unintentionally).

Another example is a background job that periodically updates/deletes data from the database tables. The background job does not operate through the email application and thus by-passes the retention policies. To ensure compliance, the background job must be programmed to be aware of the email retention policies and to comply with the email application's logic to prevent updates/deletions. Other background jobs must also be individually reprogrammed, which can be time intensive. Of course, if a policy changes, then all applications and background jobs that are affected must be identified and reprogrammed. This type of records management does not ensure compliance with implemented policies.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

FIGS. 2a-2b illustrates one embodiment of a database table before and after a column is added.

FIG. 2c illustrates one embodiment of a life cycle table.

FIG. 2d illustrates one embodiment of a life cycle log table.

DETAILED DESCRIPTION

Systems, methods, and other embodiments are described herein that provide records management techniques. In one embodiment, records management features are pushed down and implemented into a database table itself rather than at a user application level. In one embodiment, the database is configured to be aware of and determine a life cycle of a record. Physical access to the database is protected even when someone or something (e.g. computer process) by-passes the user application that operates on the database and tries to access the physical database directly. In this manner, the database is configured to provide the infrastructure for compliance solutions.

Figure 1:
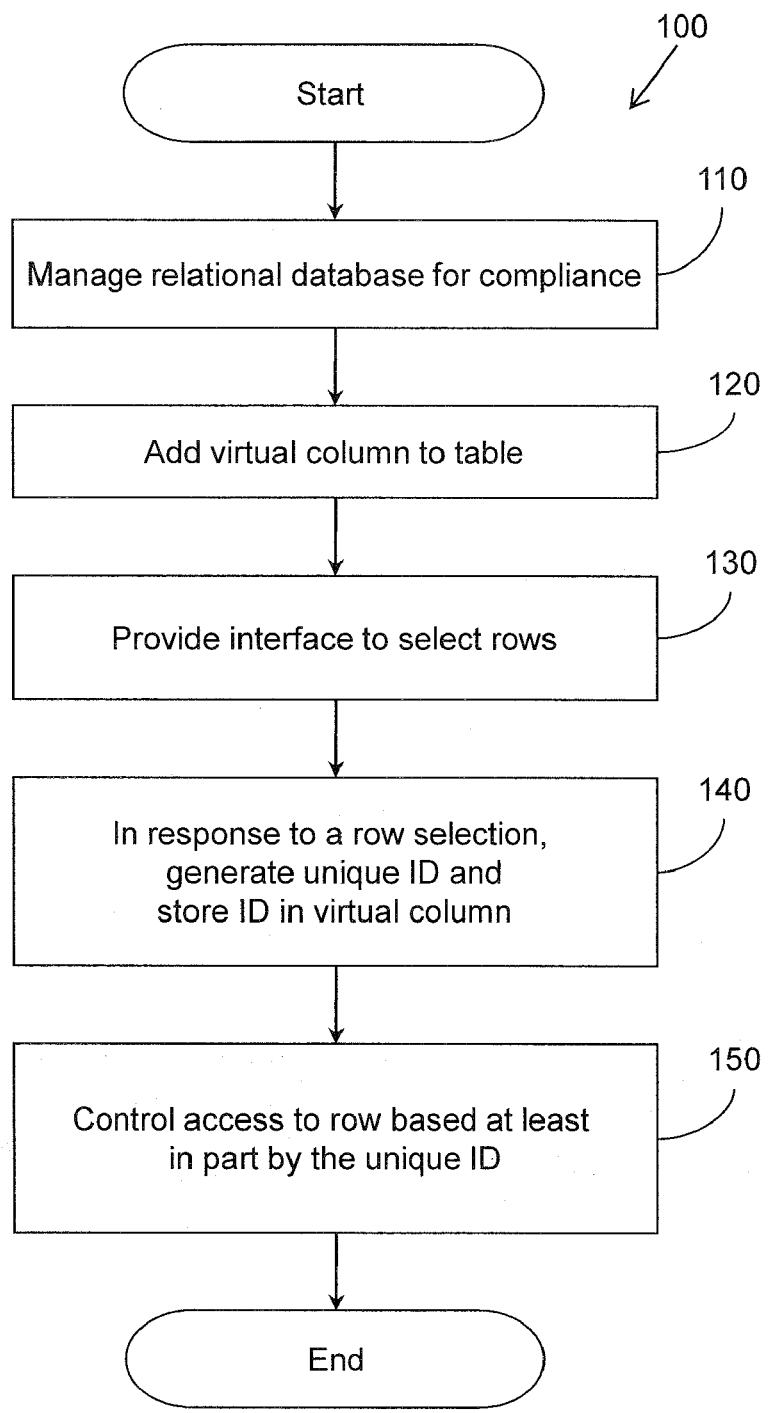
FIG. 1 illustrates one embodiment of a method associated with records management.

With reference to FIG. 1, one embodiment of a method 100 is illustrated that is associated with records management. The method 100 is computer-implemented and in one embodiment, may be implemented as executable instructions stored in a non-transitory computer-readable medium. At 110, the method provides for managing a relational database for compliance with record retention rules. The relational database includes one or more tables. A table is organized in rows and columns where each row represents a single, implicitly structured data item, and each column defines a field in the row. To implement a compliance policy for data in the table, the table is designated to be records managed. The designation may be performed by a programming instruction, a selection via a graphical user interface, or other selection mechanism. This will be described in more detail below.

At 120, a virtual column is added to the table that has been designated to be records managed. FIG. 2a illustrates an example of an accounts payable table 200 as originally created. FIG. 2a is a "before" image of the table since it does not include a virtual column. FIG. 2b shows the table 200 "after" a virtual column 210 is added to the pre-existing table 200.

In one embodiment, the virtual column is not included in a visible structure of the table and is not accessible from a user query application. For example, the virtual column 210 is a pseudo column or hidden column. It can be selected through a records management interface but not updated or deleted by a user. This prevents tampering with the virtual column 210 and its data.

With continued reference to FIG. 1, at 130, the method provides an interface to allow a user to select rows to be records managed. Since records management is an administrative task, the user in this case is most likely an authorized database administrator. When selecting one or more rows, the selected rows are marked or designated to be a "record." As stated, a "record" is recorded information that is under records management control. Retention rules/policies then apply to the data within the selected rows. At 140, in response to a row in the table being designated as a managed record, a unique identifier is generated for the row and the unique identifier is stored in the virtual column associated with the row.

For example in FIG. 2a, suppose row 1 (payment ID=1) is selected to be a record. A unique identifier (e.g. "1515515") is generated and stored in the virtual column 210 for row 1. Other unique identifiers are generated for other selected rows. The row with Payment ID=2 does not include a unique identifier in the virtual column 210 and thus is not subject to records management control. The virtual column 210 is labeled as REC_ID (record identifier) but other labels may be used.

Once a unique identifier is stored and assigned to the row, access to data in the row is controlled at least in part by the unique identifier. In one embodiment, the existence of the unique identifier is an indicator that the data in the row cannot be updated or deleted. Thus, regardless of how the access is made or from which application, the database will not permit a row with a unique identifier to be modified or deleted.

In another embodiment, pre-defined rules can be applied to a row during its life cycle. For example, the unique identifier links the row to retention rules that apply to the row. The retention rules may be defined in a life cycle table that defines actions that can or cannot be performed along with time durations and/or dates. Particular retention rules in the life cycle table 220 are linked to a row in the table 200 by assigning the same unique identifier as in the corresponding row. FIG. 2b shows a life cycle table 220 and shows rows in the table 200 of FIG. 2a linked to actions in the life cycle table 220. Thus the marked row and its data are subject to pre-defined rules/actions that are maintained in the life cycle table 220. For example, the row with payment ID=1 is linked to actions in the life cycle table 220 where the action is "Retain" and the duration is "3 years." Thus the record must be retained and not deleted/updated for 3 years.

In another embodiment, if a row is designated as being a managed record and the unique identifier is assigned to the row, then access from a database level interface or access from an application level interface to the row is controlled based at least in part on the unique identifier. For example, since the records management features are implemented on the database itself, external applications such as a user application (e.g. email application) cannot by-pass the management features.

As stated previously, even though the email application may have record retention rules implemented internally, a person or process may have ways to access the database directly and thus not go through the email application. Similarly, a database administrator can by-pass the user application and can access the physical database directly (due to appropriate authorization). Data can be deleted intentionally or unintentionally. However, with the implemented features, these types of accesses are still subjected to control based on the unique identifier. If the unique identifier exists for a row that the database administrator attempts to update/delete, the operation is prohibited.

In another embodiment, FIG. 2d illustrates an example log table 230 that may be generated and maintained for marked records. When an operation is attempted on a marked record from the table 200, an event is stored in the log table 230 and is associated with the corresponding unique identifier (e.g., REC_ID). For example, REC_ID 2552525 shows that an "illegal access" was attempted on the corresponding record (e.g. an illegal delete action). Access may have been denied for various reasons such as the user did not have appropriate authorization to delete the record or the retention period has not yet expired. Retention periods determine the length of time that a record must be kept, unless there is a legal or regulatory action requiring that certain records be held or frozen from possible destruction.

In another embodiment, method 100 may include a soft delete feature. A soft delete is where data is deleted from a user's application but is not deleted from the main database. The soft delete may also delete a record from the relational database but then move the record to a read-only tablespace where it is retained.

For example, a user may wish to clean out his/her email in-box and delete old emails to make it more manageable (e.g. user has a large volume of emails). However, suppose retention rules have been applied that prohibit the deletion of the emails. Rather than prohibit the user from cleaning out the in-box, the emails can be deleted from the user's in-box (and from his/her view). But, the emails are then stored in a separate storage device/location to comply with the retention rules. Thus although the user believes the emails are deleted, they still exist in a different location.

The following example is one embodiment for defining a database table using the CREATE TABLE syntax of SQL/Oracle Database. Of course, other syntax can be used based on the database application/programming language that is used. For example, an additional option is provided to organize the table as "Records Managed" as part of the CREATE TABLE command that defines a new table or as part of an ALTER TABLE command that alters an existing table.

```
CREATE TABLE Table_Name
    ORGANIZATION RECORDS_MANAGED
        [RETENTION RECORD|NON-RECORD|CUSTOM DEFAULT
        RECORD]
        [RMA_ROLE ROLE_NAME DEFAULT RMA_ADMIN]
        [AUTO_PURGE ON|OFF DEFAULT OFF]
        [LC_TABLE TABLE_NAME
        TABLE_NAME_LC_TABLE]
        [SOFT_DELETE ON|OFF DEFAULT OFF]
        [STORAGE IN_PLACE|READ_ONLY_TABLESPACE
        DEFAULT IN_PLACE]
```

In this CREATE TABLE construct, the table created is classified to be RECORDS_MANAGED in an ORGANIZATION parameter. This classification causes a virtual column to be added to the table. It should be appreciated that other parameters that may appear as part of the CREATE TABLE instructions are not shown here. For example, other parameters may include defining fields, field types, key fields, and so on. Thus when a table is created, a number of fields are defined for each row, where each field is a column in the table. However, the virtual column is not defined as a field.

Various options may be provided under the RECORDS_MANAGED classification. As seen above in the CREATE TABLE construct, the first line designates a "RETENTION" option that designates the table to be a record, non-record, or custom type. As a "RECORD," the data is retained for applicable compliance policies. A "NON-RECORD" can be used for data that is not necessarily subject to compliance policies but other desired rules can be applied. For example, it can be used for personal information that should be purged after a period of time (e.g., after 3 years). Thus a non-record can be used for data that does not require retention but does require destruction after a certain period. The "CUSTOM" option can be used to specify custom retention/destruction rules. One or more options can also have a default setting if not specified. Sample default settings appear after the "DEFAULT" term in each command line.

The "RMA_ROLE" option designates the records management administrator (RMA) role. The "AUTO_PURGE" option may be on or off. The "LC_TABLE" option identifies the Life Cycle Table that is linked with the table. As explained previously, the life cycle table defines retention and/or disposition rules that apply to associated records (e.g., preserve for 5 years, then move to location B, then destroy record). The "SOFT_DELETE" option, as explained above, allows for records to be removed from the user application but not from the main database. The "STORAGE" option can be set as "in place" or "read only tablespace." The "in place" setting is mutually exclusive with the "soft delete" option. The "read only tablespace" means that once the data is written, it can only be read and cannot be deleted or modified.

A similar process can be performed to an existing database table using, for example, an ALTER TABLE command:

```
ALTER TABLE AC_PAYABLES
    ORGANIZATION RECORDS_MANAGED
    [Options]
```

With this command, the pre-existing table named "AC_PAYABLES" is reorganized to be "Records Managed" and thus under the control of records management. In one embodiment, when a database administrator creates or alters a table as shown above, the database:

- Adds a pseudo/virtual column RECORD_ID to the TABLE specified.
- Creates additional internal tables (e.g. Life Cycle Table, Log Table, etc) as required. These tables are not accessible to end-user or administrator to prevent tampering.
- Adds additional checks during requests to update or delete data from the table. Modification of rows that are marked as records is prohibited.

In one embodiment, application program interfaces (API) are provided to perform operations related specifically to records management. The following APIs can be implemented as commands that are applicable to a specified table that has been classified as "records managed" and are available to an administrator after the classification is made:

```
DBMS_RM_MARK_ROW_AS_RECORD (rowid ROWID,
Options...)
DBMS_RM_PURGE_RECORD_ROW (rowid ROWID, Options...)
```

The example commands are labeled as DBMS_RM, which stands for Database Management System Records Management. Of course, other names can be used. The first command is used to mark specified rows as a "record" and includes parameters to identify the rows (e.g. identify by row ID). The command is one example of an interface that may be provided for selecting rows as records with respect to block 130 in FIG. 1. Other desired "options" can be included. The second command is used to purge specified rows. As stated previously, after a row is designated or marked as a "record," a record ID is generated and stored in the virtual column for that row. In another embodiment, a graphical user interface can be provided to allow for selection of rows instead of or in combination with the command level instructions. The database system can be configured where these interfaces provide the only access to the virtual column so as to reduce data tampering.

In one embodiment, changing the organization of an existing table to be "records managed" using the ALTER TABLE command does not alter the logical structure of the table. The virtual column is added or associated with the table but is hidden from view and cannot be accessed by users. This also means that a table can be switched back and forth between being "Records Managed" or not. Once a table is classified as "Records Managed," the method and system then allows the database administrator to use the Records Management APIs specified above to manage the records in the database.

When data is marked as a record, based on the options defined in the CREATE/ALTER table command, the database can automatically save a copy of this record in a WORM storage (write once read many) that would be available for restoration of the record if needed. Also, given that the record is stored in a database, the typical features of data replication and disaster recovery are additional benefits to an application that uses the records management approach. In another embodiment, the records are given an inherent expiration date and associated life cycle. Hence replicated copies of the database may also purge the data at the same time as the original record that is intended to be destroyed.

Figure 3:
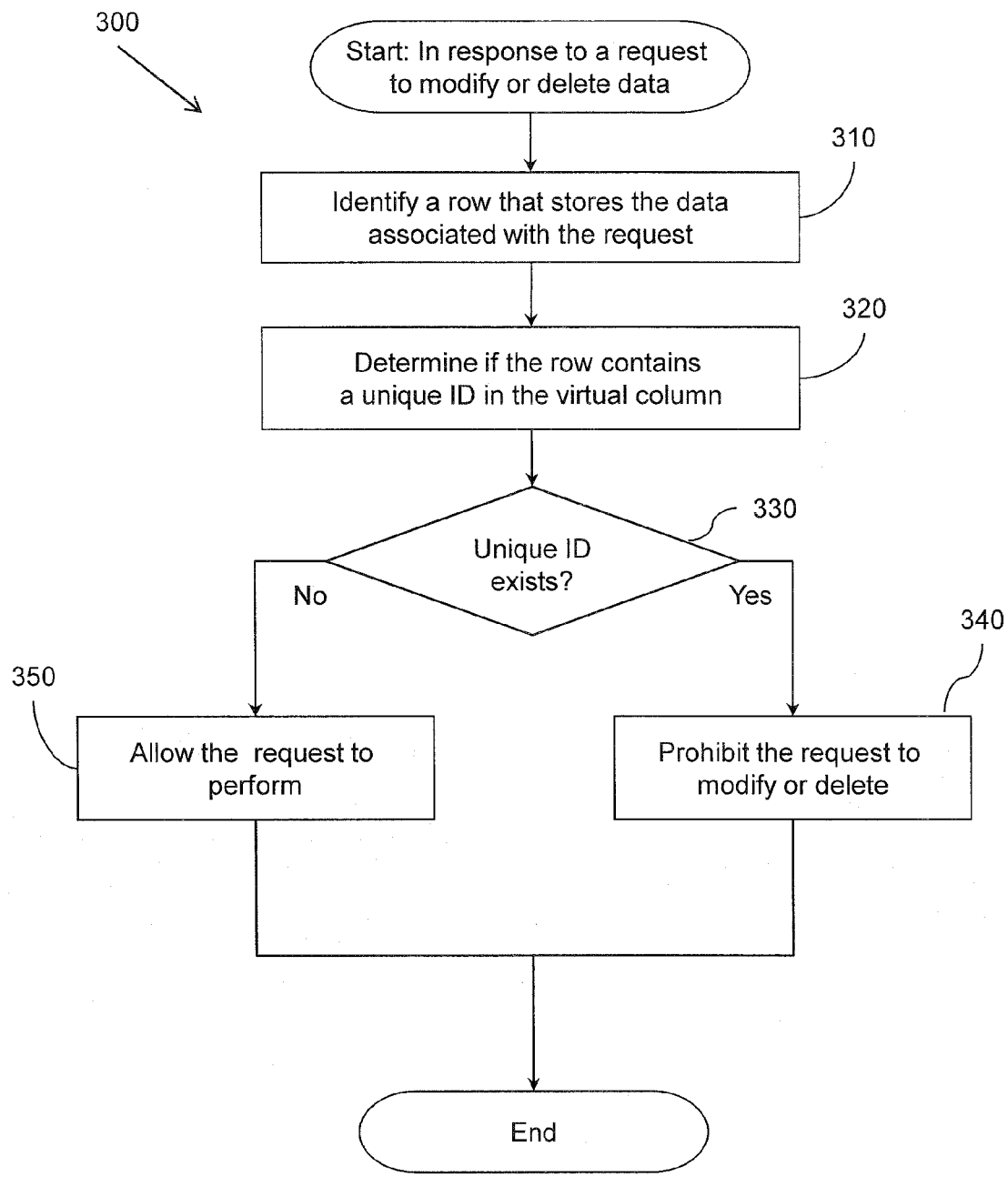
FIG. 3 illustrates one embodiment of a method associated with controlling access to a database.

With reference to FIG. 3, one embodiment of a method 300 is illustrated that is associated with controlling access to a database in view of compliance policies. Method 300 is described from the view point that a request is made to modify or delete data from the database and a controller (e.g. a physical access manager) is responsible for processing requests to the database. Presume that the database has been created and selected rows have been marked as "records managed" as described with reference to FIGS. 1-2. Thus the database includes a virtual column and marked records have a unique identifier assigned in the virtual column. Unmarked rows do not have an assigned unique identifier.

Method 300 initiates in response to receiving a request to modify or delete data from the database. In some embodiments, the request may be part of a query. Before processing the request, the method performs compliance operations to determine if the request is permitted. At 310, the method identifies the row(s) that store the data associated with the request. This may involve a query parser that parses the query to extract terms and determines which rows are requested. At 320, once the row is identified, the method determines if the row contains a unique identifier in the virtual column. At 330, if the unique identifier exists, then the request to modify or delete is prohibited at 340. If the unique identifier does not exist in the virtual column, the request is allowed to perform on the data within the row because the row is not subject to records management. The method repeats for as many rows that are involved in the request.

Thus, whenever a record/row is being updated, the database checks if the row is marked as a "record" based on the presence of the ID in the virtual column. This process prevents updates to data that needs to be retained. However, an administrator that is granted records management administrator privileges can delete marked rows using the records management commands/interfaces identified above as DBMS_RM commands.

Figure 4:
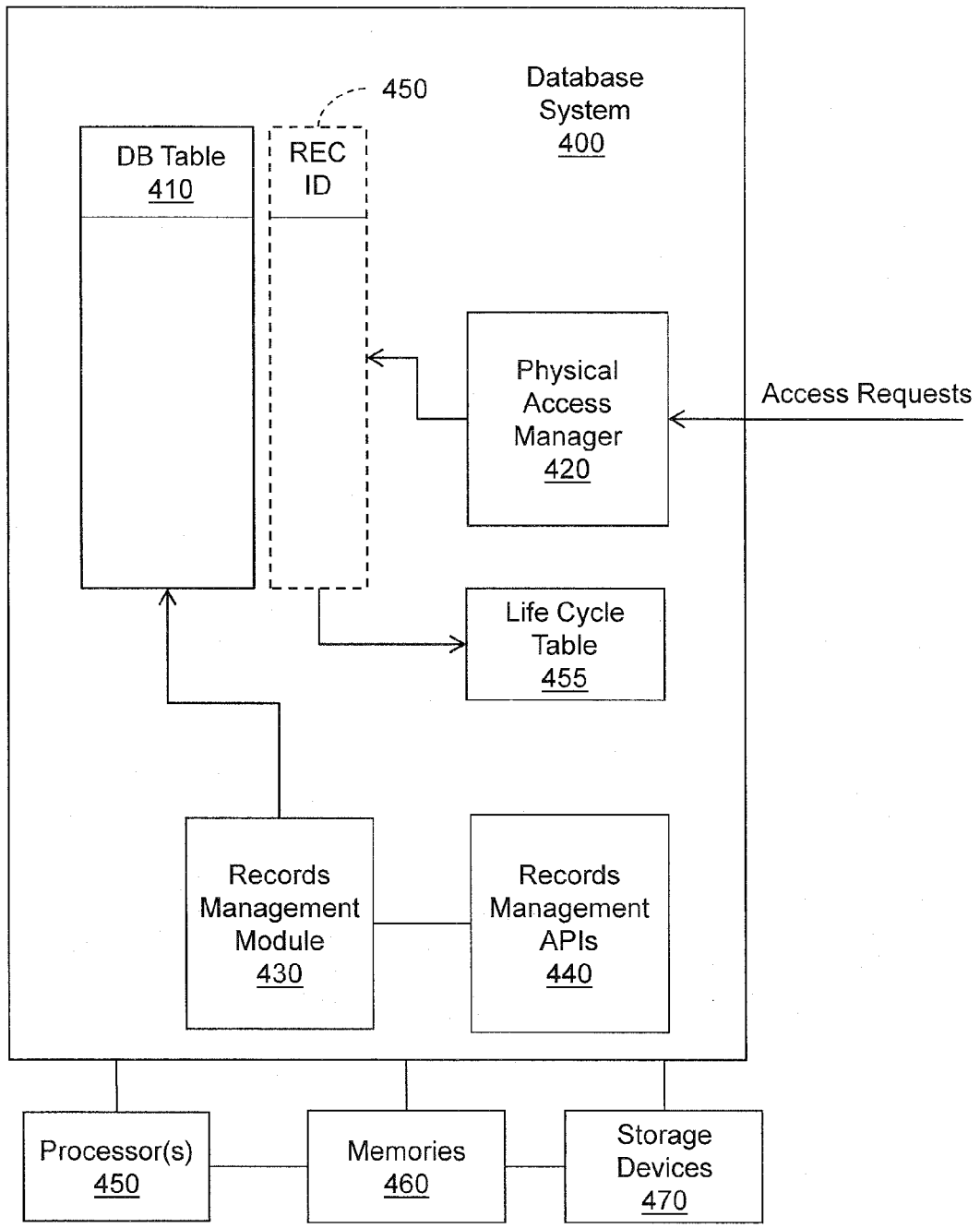
FIG. 4 illustrates an embodiment of a database system that includes records management.

FIG. 4 illustrates one embodiment of a database system 400 that is configured with one or more of the records management features described with reference to FIGS. 1-3. FIG. 4 is a simplified example and does not show all possible components of a database system, which can be very complex. A database table 410 is maintained on one or more non-transitory storage devices and a physical access manager 420 is configured to control access requests to the data in the database table 410. For example, user applications or background tasks issue access requests that wish to perform various operations (e.g. write data, read data, modify data, delete data, and so on).

The database system 400 includes a records management module 430 and records management application program interfaces (APIs) 440. The records management module 430 is configured to create and implement records management features that are applied to a selected table as described above. For example, suppose the table 410 is selected to be "records managed." The records management module 430 causes a virtual column to be added to the table as shown by column 450. The virtual column 450 is labeled as REC ID and is used to store a unique identifier for marked rows. The virtual column 450 and the marked rows are linked to applicable rules in a life cycle table 455 as previously described.

The records management APIs 440 allow for the selection of rows to be marked as a "record" that are subject to compliance rules. The physical access manager 420 is configured to control access to the table 410 by checking the virtual column 450 to determine whether or not a modification or deletion request is permitted. In one embodiment, the physical access manager 420 is configured to perform the method of FIG. 3.

In one embodiment, the database system 400 is part of a computing system that includes one or more processors 460, memories 470, storage devices 480, and other computer components that operate with the database system 400. In one embodiment, the physical access manager 420 and the records management module 430 are implemented with logic as defined herein. This may include hardware components, firmware, a non-transitory computer readable medium with stored instructions, or combinations of these elements.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

In another embodiment, the database system 400 is configured to automatically partition the database table 410 into two tablespaces based on whether the record identifier in the virtual column 450 is present or null. One tablespace includes all rows that have a record identifier assigned to them (e.g. rows that are marked as records). The other tablespace includes all rows that have a null record identifier in the virtual column 450 (e.g. rows not marked as records). Once a row is marked as a record and has a non-null record identifier, the record is moved to a read-only tablespace and thus cannot be modified.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Glossary

Various terms are listed here for convenience.

Cutoff: When a record is marked to begin its disposition or retention cycle.

Disposition: The set of rules which specify what to do with records as part of their lifecycle. This may include retaining, moving, or deleting records.

Freeze/Unfreeze: The ability to stop the final disposition instruction (delete) in the lifecycle of a record from being executed. Other disposition instructions (e.g., retain and move) are executed. In one embodiment, the system is implemented to support legal holds, which allows the records management module 430 (used by an administrator) to suspend the lifecycles of records in a record category or folder indefinitely by using a freeze/unfreeze command.

Hardware immutability: The ability of the hardware to prevent anyone from accessing, altering or deleting any content stored on a disk. In one embodiment, the physical access manager 420 of FIG. 4 is configured with this feature.

Lifecycle: The life span of a record from its creation or receipt to its final disposition. It is usually described in three stages: creation, maintenance and use, and final disposition.

Record: Any form of recorded information that is under records management control.

Retention period: The set of rules which specify how long to keep records.

RAM: random access memory.

DRAM: dynamic RAM.

ROM: read only memory.

SQL: structured query language.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an ASIC (application specific integrated circuit), a compact disk, other optical medium, a RAM, a ROM, programmable memories, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data tables and methods for accessing and/or manipulating those data tables.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
    managing a relational database that stores records in compliance with record retention rules, where the relational database includes a table organized with rows and columns, where respective rows in the table store respective records, where the managing comprises:
        adding a virtual column to the table that stores the records in the relational database;
        providing an interface to select and designate a record stored in the table as a managed record;
        in response to a record in the table being designated as a managed record, generating a unique identifier and storing the unique identifier in the virtual column in the row that stores the managed record, where access to data in the row is controlled at least in part by a retention rule that is mapped to the unique identifier;
        where a first managed record stored in a first row is subject to a pre-defined life cycle specified by one or more retention rules mapped to a first unique identifier stored in the first row and further where a second managed record stored in a second row includes data that is subject to a different pre-defined life cycle specified by one or more retention rules mapped to a second unique identifier stored in the second row; and
        in response to receiving a request to modify or delete a record in the table, identifying a retention rule mapped to the unique identifier in the virtual column of the row.

2. The non-transitory computer-readable medium of claim 1, further comprising instructions for:
    in response to a request to modify or delete a record in the table, performing a compliance operation comprising:
        (i) identifying a row in the table that stores the record associated with the request;
        (ii) determining whether the row contains a unique identifier in the virtual column;
        (iii) when the unique identifier exists, prohibiting the request to modify or delete the data from the row; and
        (iv) when the unique identifier does not exist, allowing the request to be performed.

3. The non-transitory computer-readable medium of claim 1, where respective retention rules are stored in a life cycle table and are mapped to respective unique identifiers.

4. The non-transitory computer-readable medium of claim 1, where the virtual column is not included in a visible structure of the table and is not accessible from a user query application.

5. The non-transitory computer-readable medium of claim 1, where when a record is designated as being a managed record and the unique identifier is stored in the virtual column of to the row, access from a database level interface or access from an application level interface to the row is controlled based at least in part on a retention rule mapped to the unique identifier.

6. The non-transitory computer-readable medium of claim 1, further comprising moving a managed record that is deleted from the table to a read-only tablespace.

7. The non-transitory computer-readable medium of claim 1, where providing the interface includes providing an application programming interface that is configured to provide the only access to the virtual column.

8. A database system, comprising:
    a processor;
    a non-transitory computer-readable medium for storing records in a database table organized with rows and columns of data, where respective rows in the table store respective records;
    a records management module configured to receive an indication that the table stores managed records, and in response, to add a virtual column to the table that stores the records;
    where the records management module is configured to generate a unique identifier for each row in the table that stores a record that is designated as a managed record and to store the unique identifier in the virtual column in the row;
    where a first managed record stored in a first row is subject to a pre-defined life cycle specified by one or more retention rules mapped to a first unique identifier stored in the first row, and further where a second managed record stored in a second row includes data that is subject to a different pre-defined life cycle specified by one or more retention rules mapped to a second unique identifier stored in the second row; and
    a physical access manager configured to process requests to modify records in the table;
    where the physical access manager is configured to:
        i) determine whether a unique identifier is stored in the virtual column of a row that stores a requested record prior to processing the request,
        ii) to identify a retention rule mapped to the unique identifier in the virtual column of the row, and
        iii) to control access to the row based on the identified retention rule.

9. The database system of claim 8, further comprising an application programming interface configured to allow selection of records to having a life cycle specified by a retention rule.

10. The database system of claim 8, further comprising a life cycle table that stores retention rules, where respective retention rules are mapped to respective unique identifiers.

11. The database system of claim 8, where the virtual column is not included in a visible structure of the table and is not accessible from a user query application.

12. The database system of claim 8, where the database system is configured to partition the table into two tablespaces, where rows that include the unique identifier in the virtual column are moved to a read-only tablespace and where rows with no unique identifier are stored in a separate tablespace.

13. A non-transitory computer-readable medium storing computer-executable instructions that when executed by a computer cause the computer to perform a method, the method comprising:
  in response to a request to modify or delete a record in a table storing respective records in respective rows, performing a compliance operation comprising:
    (i) identifying a row in the table that stores the record associated with the request;
    (ii) determining whether the row contains a unique identifier in a virtual column in the table, where a first record stored in a first row is subject to a pre-defined life cycle specified by one or more retention rules mapped to a first unique identifier stored in the first row, and further where a second record stored in a second row includes data that is subject to a different pre-defined life cycle specified by one or more retention rules mapped to a second unique identifier stored in the second row;
    (iii) when the unique identifier exists, identifying a retention rule mapped to the unique identifier in the virtual column of the row, and controlling access to the row based on the identified retention rule; and
    (iv) when the unique identifier does not exist, allowing the request to be performed.

14. The non-transitory computer-readable medium of claim 13, where the rows of the table are linked to applicable compliance rules by the unique identifier stored in the row.

15. The non-transitory computer-readable medium of claim 13, further comprising instructions for generating a life cycle table that maps the compliance rules to unique identifiers.

16. The non-transitory computer-readable medium of claim 15, where the instructions include, in response to receiving the request:
  identifying rows in the table that are affected by the request; and
  for a selected row, accessing the life cycle table to determine the compliance rules that are mapped to the unique identifier in selected row.

17. The non-transitory computer-readable medium of claim 13, where the virtual column is not included in a visible structure of the table and is not accessible from a user query application.

18. The non-transitory computer-readable medium of claim 13, further comprising moving a managed record that is deleted from the database to a read-only tablespace.

* * * * *

UNITED STATES PATENT AND TRADEMARK OFFICE
CERTIFICATE OF CORRECTION

| | |
|---|---|
| PATENT NO. | : 8,386,533 B2 |
| APPLICATION NO. | : 12/956395 |
| DATED | : February 26, 2013 |
| INVENTOR(S) | : Venkata Naga Ravi |

It is certified that error appears in the above-identified patent and that said Letters Patent is hereby corrected as shown below:

In the Claims

In column 10, line 11, in Claim 5, after "of" delete "to".

Signed and Sealed this
First Day of September, 2015

Michelle K. Lee
*Director of the United States Patent and Trademark Office*